United States Patent
Yamashita et al.

(10) Patent No.: US 6,190,621 B1
(45) Date of Patent: Feb. 20, 2001

(54) DESULFURIZATION APPARATUS AND ELECTRIC POWER PLANT USING THE SAME

(75) Inventors: Keijiro Yamashita; Keiji Murata; Michio Hori; Takashi Ogawa, all of Kanagaw-ken (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/083,945

(22) Filed: May 26, 1998

(30) Foreign Application Priority Data

May 26, 1997 (JP) .................................................. 9-134875

(51) Int. Cl.[7] .............................. B01D 53/22; B01D 53/48
(52) U.S. Cl. ................................ 422/177; 95/49; 422/178; 422/180
(58) Field of Search ........................ 95/44, 49; 202/81, 202/152, 158; 422/168, 169, 170, 171, 173, 180

(56) References Cited

U.S. PATENT DOCUMENTS 4,416,676 * 11/1983 Montierth .............................. 55/523
5,313,781 * 5/1994 Toda et al. ............................ 60/39.12
5,318,755 * 6/1994 Kuivalainen et al. ................ 422/171

OTHER PUBLICATIONS

DOE Report; DOE-MC-26038-3823, R. Quinn et al, "Facilitated Transport Ceramic Membranes for High-Temperature Gas Cleanup," Apr. 1994.

DOE/METC/C-95/7158, A. S. Damle et al, "Facilitated Transport Ceramic Membranes for High Temperature $H_2S$ Removal," Jul. 1994.

* cited by examiner

Primary Examiner—Shrive Beck
Assistant Examiner—Frederick Varcoe, Jr.
(74) Attorney, Agent, or Firm—Oblon, Spivak, McClelland, Maier & Neustadt, P.C.

(57) ABSTRACT

The speed of coal gas desulfurization is improved and the total size of the apparatus can be made compact. The apparatus comprises a sulfide-ion-producing portion (54), which reacts with a sulfur compound being supplied by the coal gas and produces sulfide ion $S^{2-}$ in molten carbonate. A sulfur compound discharge portion (53) discharges a sulfur compound produced by a reaction with sulfur discharge gas (56).

2 Claims, 7 Drawing Sheets

DESULFURIZATION APPARATUS AND ELECTRIC POWER PLANT USING THE SAME

BACKGROUND OF THE INVENTION

1 Field of the Invention

The present invention relates to a desulfurization apparatus for coal gas containing sulfur, and an electric power plant using the same.

2 Description of the Related Art

Among fossil fuels, coal is distributed widely in the world in comparison with oil and natural gas. Fossil fuel reserves are plentiful and are expected to be used in the future for generating electric power. A known method of generating electric power involves pulverizing coal in order to be burned.

In view of thermal efficiency and adaptability to the environment, there has been developed a coal gasification compound electric power plant in which coal is gasified. The gasified coal is first desulfurized, burned, and then the burned gas is then fed to a gas turbine and a steam turbine to generate electric power.

FIG. 1 is a block diagram of a conventional coal gasification combined electric power plant using a desulfurization apparatus. Electric power plant 21 has coal gasification equipment 22, gas purification equipment 41, and compound electric power generating equipment 24. The coal gasification equipment 22 includes gasification furnaces 27a and 27b, that mix pulverized coal 25 and a gasification agent 26 (normally, oxygen) and perform gasification under predetermined conditions. A gas cooler 28 cools coal gas 11 which is exhausted from the gasification furnace 27b.

The coal gas 11 exhausted from the gas cooler 28 passes through the desulfurization tower 2 within the dry desulfurization apparatus 1. Thereafter, the gas 11 passes through a filter 29 provided within the scrubbing apparatus 23. Then, the gas 11 is supplied to the combined electric power generating equipment 24.

The coal gas 11 is burned in a burner 30 provided within the combined electric power generating equipment 24. The burned gas is supplied to an exhaust heat recovery boiler 33 through a gas turbine 31. A condenser 36 and a steam turbine 35 are provided in the exhaust heat recovery boiler 33.

Operation of the coal gasification combined electric power plant 21 having the above structure will be described below. The pulverized coal 25 and the gasification agent 26 are mixed. The mixed gas is supplied to the gasification furnace 27a which has a high temperature. In the gasification furnace 27a, a reaction occurs in which carbon is mainly oxidized to carbon dioxide. An inner portion of the gasification furnace 27b is under high pressure and a reduction reaction takes place mainly between the carbon dioxide and carbon therein. Carbon monoxide is produced through the reduction reaction. Accordingly, the gasification furnaces 27a and 27b gasify the coal at a high temperature and a high pressure (which varies according to the gasification method, for example, about 1400° C. and about 2 MPa) so as to produce the coal gas 11. The produced coal gas 11 is composed of carbon monoxide, hydrogen, carbon dioxide, and water vapor.

The coal gas 11 is cooled to a suitable temperature (about 500° C.) in the gas cooler 28. The cooled coal gas 11 is fed to the desulfurization tower 2 within the gas purification equipment 41.

The desulfurization tower 2 removes $H_2S$ contained in the coal gas 11. The coal gas 11 exhausted from the desulfurization tower 2 passes through the filter 29 thereafter. The filter 29 removes dust contained in the coal gas 11. Accordingly, the desulfurization tower 2 and the filter 29 remove sulfur and fine particles that cause corrosion and abrasion of the gas turbine by passing the coal gas 11 therethrough.

The clean coal gas 11 from which sulfur and fine particles are removed is supplied to the combined electric power generating equipment 24.

The clean coal gas 11, purified in the gas purification equipment 41, is burned in the burner 30. The burned combustion gas rotates the gas turbine 31 to generate electric power. Exhaust gas 32 is exhausted from the gas turbine 31 and fed to the exhaust heat recovery boiler 33. The exhaust heat recovery boiler 33 takes the heat from the exhaust gas 32 so as to produce steam 34. Steam 34 rotates the steam turbine 35 to generate electric power. The steam 34, exhausted from the steam turbine 35, is condensed in the condenser 36. A part of the condensed steam is fed back to the exhaust heat recovery boiler 33. The remainder of the condensed steam is fed to the gas cooler 28.

Further, heat recovered from the coal gas 11 in the gas cooler 28 is combined with the steam 34 fed from the exhaust heat recovery boiler 33 fed to the steam turbine 35. Thereafter, the steam 34 is discharged from the steam turbine 35 and returned to the gas cooler 28 through the condenser 36.

When coal is gasified, most of the sulfur contained in the coal becomes hydrogen sulfide and becomes mixed with the coal gas 11. A convention desulfurization apparatus for removing the hydrogen sulfide at a high temperature using iron oxide as the desulfurization agent, is the dry desulfurization apparatus 1. The dry desulfurization apparatus 1 performs desulfurization while keeping the temperature of the coal gas 11 high for as long as possible. The fluid upon which the desulfurization function has been performed is supplied to the compound electric power generating equipment 24. The dry desulfurization method exhibits excellent thermal efficiency.

The structure of the dry desulfurization apparatus 1 will be described below with reference to FIG. 2. It comprises a desulfurization tower 2, a regeneration tower 3, a reduction tower 37, a sulfur condenser 8, a circulation gas compressor 9 and a heater 10.

The coal gas 11 flows from an end (the lower portion in the drawing) of the desulfurization tower 2. The flowing coal gas 11 is mixed with desulfurization agent 38 provided within the desulfurization tower 2. A chemical reaction between the coal gas 11 and the desulfurization agent 38 occurs according to formula (1).

$$Fe_2O_3+2H_2S+H_2 \rightarrow 2FeS+3H_2O \tag{1}$$

The coal gas 11 from which the sulfur is removed thereafter flows out from the other end (the upper portion in the drawing) of the desulfurization tower 2.

The desulfurization agent 38 which absorbs the sulfur contained in the coal gas 11, thus becoming a sulfide, and is fed to an end (the upper end in the drawing) of the regeneration tower 3. Air 39, including oxygen, is supplied from the other end (the lower portion in the drawing) of the regeneration tower 3. A chemical reaction shown in formula (2) occurs between the sulfide and the air within the regeneration tower 3, so that the sulfide is oxidized. The sulfide can be regenerated by this oxidizing reaction.

$$4FeS+7O_2 \rightarrow 2Fe_2O_3+4SO_2 \tag{2}$$

The regenerated desulfurization agent 38 is again fed to the desulfurization tower 2 and reused. The desulfurization agent 38 is moved between the desulfurization tower 2 and the regeneration tower 3 by air current transmission.

The sulfur removed from the desulfurization agent 38 becomes a sulfurous acid gas in the regeneration tower 3. That gas is then fed to the reduction tower 37 as a regeneration tower outlet gas 14. The regeneration tower outlet gas 14 is supplied to an end (the lower portion in the drawing) of the reduction tower 37 and undergoes a chemical reaction (3) with a smokeless coal 40 supplied to the other end (the upper portion in the drawing) of the reduction tower 37, as shown in the following formula:

$$2C + 2SO_2 \rightarrow 2CO_2 + S_2 \qquad (3)$$

A sulfur steam is produced by the chemical reaction that flows into the sulfur condenser 8 (the upper portion in the drawing).

The sulfur steam is cooled within the sulfur condenser 8. The sulfur steam is condensed by the cooling and discharged to an outer portion of the dry desulfurization apparatus 1 as the chemical element sulfur 16.

The tail gas 17 that flows from the other end (the lower portion in the drawing) of the sulfur condenser 8 is fed to the circulation compressor 9 and the pressure thereof increases. The tail gas 17 discharged from the circulation compressor 9 is fed to the heater 10 and the temperature thereof increases. A portion of the heated tail gas 17 is mixed with the coal gas 11 supplied to the desulfurization tower 2 and is then fed to the desulfurization tower 2. Some of the tail gas 17 is mixed with air 39 for regeneration and is then fed to the regeneration tower 3.

In the conventional desulfurization apparatus described above and the electric power plant using the same, the following problem has occurred. Since the desulfulrization reaction in tower 2 and the regeneration reaction in regeneration tower 3 involve solid-to-gas reactions, the overall reaction speed is less than that of a wet desulfurization apparatus. Furthermore, the reaction rate of each of the chemical reactions is low. Accordingly, the amount of desulfurization agent 38 required in the desulfurization tower 2 and the regeneration tower 3 is large and so tower 2 and regeneration tower 3 must be large in comparison to those required in a wet desulfurization apparatus. As a result, the dry process is costly.

Further, as the amount of desulfurization agent 38 increases and the power required for the air current transmission equipment of the desulfurization agent 38 and the electric power plant increases, the total size of the compound electric power plant using the conventional dry desulfurization apparatus increases. In addition, the power consumed within the electric power plant increases.

SUMMARY OF THE INVENTION

An object of the present invention is to provide a compact and inexpensive desulfurization apparatus. Another object of the invention is to provide an electric power plant in which the temperature of the gas to be processed is not lowered and circulation and regeneration of the desulfurization agent are not required.

In order to achieve the above objects in accordance with the invention, there is provided a desulfurization apparatus comprising a sulfide-ion-producing portion which reacts with a sulfur compound to producing sulfide ions; a sulfur compound supply portion disposed at one end of the sulfide-ion-producing portion; and a sulfur compound discharge portion disposed at the other end of the sulfide-ion-producing portion, that discharges the sulfur compound produced by a reaction with the sulfide ions. A plurality of the sulfur compound supply portions and a plurality of the sulfur compound discharge portions are alternately disposed through the sulfide-ion-producing portions, and the flow direction within the sulfur compound supplying portion is different from the flow direction within the sulfur compound discharging portion.

Further, in accordance with the invention, there is provided a desulfurization apparatus comprising a sulfide-ion-producing portion having a hollow cylindrical shape, reacting with sulfur compounds and producing sulfide ions; the sulfur compound supplying portion is disposed at the inner or outer side of the cylinder of the sulfide-ion-producing portion; and supplies the sulfur compound to the sulfide-ion-producing portion, and the sulfur compound discharge portion is disposed at the opposite side of the cylinder of the sulfide-ion-producing portion. It discharges the sulfur compounds produced by a reaction with the sulfide ions from the sulfide-ion-producing portion. A plurality of the sulfide-ion-producing portions are provided, and the flow direction of the fluid communicating with the inner side of the sulfide-ion-producing portion is different from the flow direction of the fluid communicating with the outer side of the sulfide-ion-producing portion.

Still further, in accordance with the invention, there is provided an electric power plant comprising a sulfide-ion-producing portion reacting with a sulfur compound and producing sulfide ions; a sulfur compound supplying portion is disposed at one end of the sulfide-ion-producing portion; and a sulfur compound discharging portion is disposed at the other end of the sulfide-ion-producing portion which discharges the sulfur compounds produced by a reaction with the sulfide ions. A plurality of the sulfur compound supplying portions and a plurality of the sulfur compound discharging portions are alternately disposed through the sulfide-ion-producing portions in an adjacent manner; the desulfurization apparatus is structured in such a manner that the direction of the fluid within the sulfur compound supplying portion is different from that of the fluid within the sulfur compound discharging portion. An electric power generating apparatus using the fluid discharged from the sulfur compound supplying portion is also taught.

DESCRIPTION OF THE PREFERRED EMBODIMENTS

Embodiments in accordance with the invention will be described below with reference to the drawings.

Figure 1:
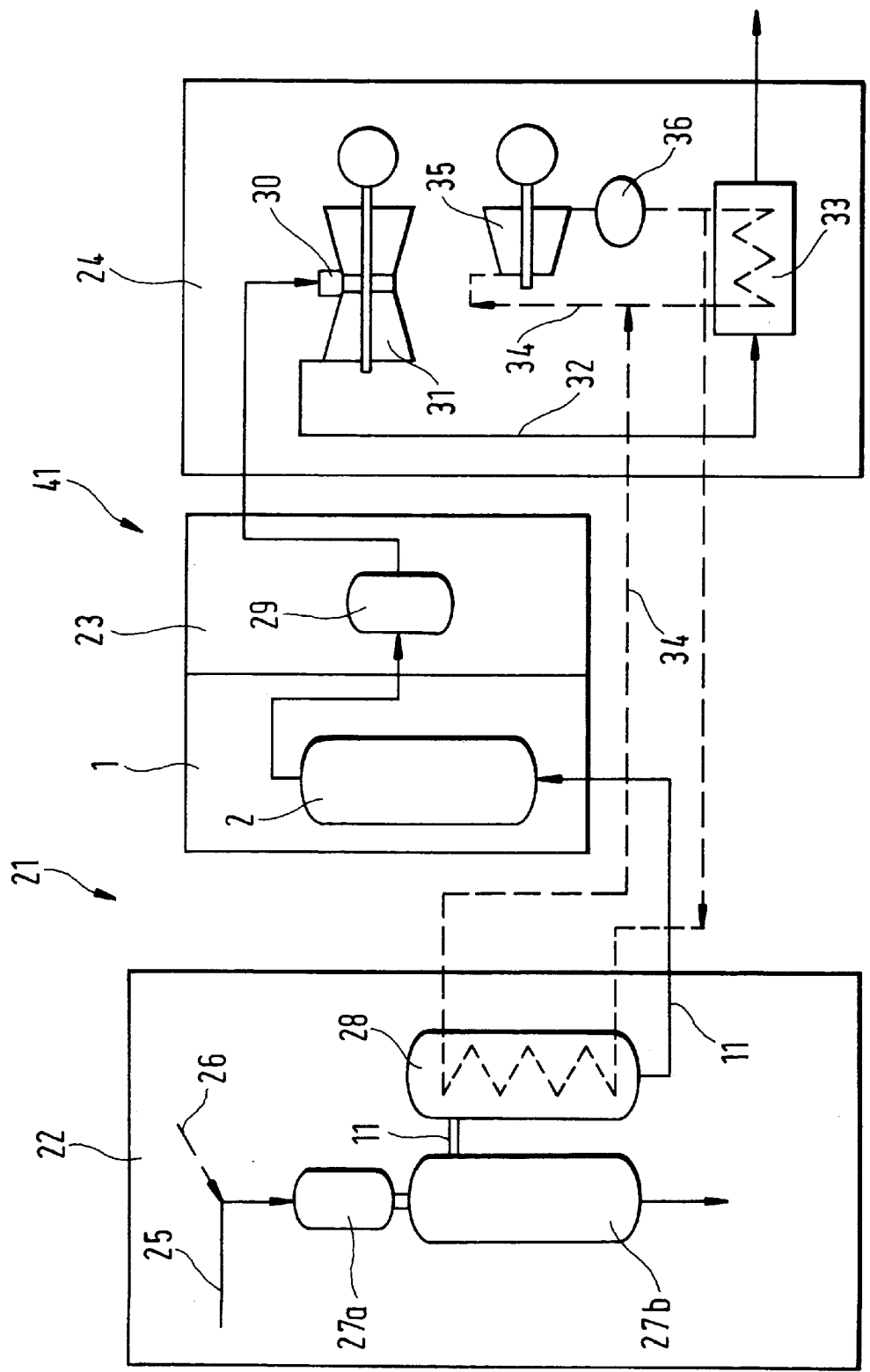
FIG. 1 is a block diagram of an electric power plant using a conventional desulfurization apparatus.
Figure 2:
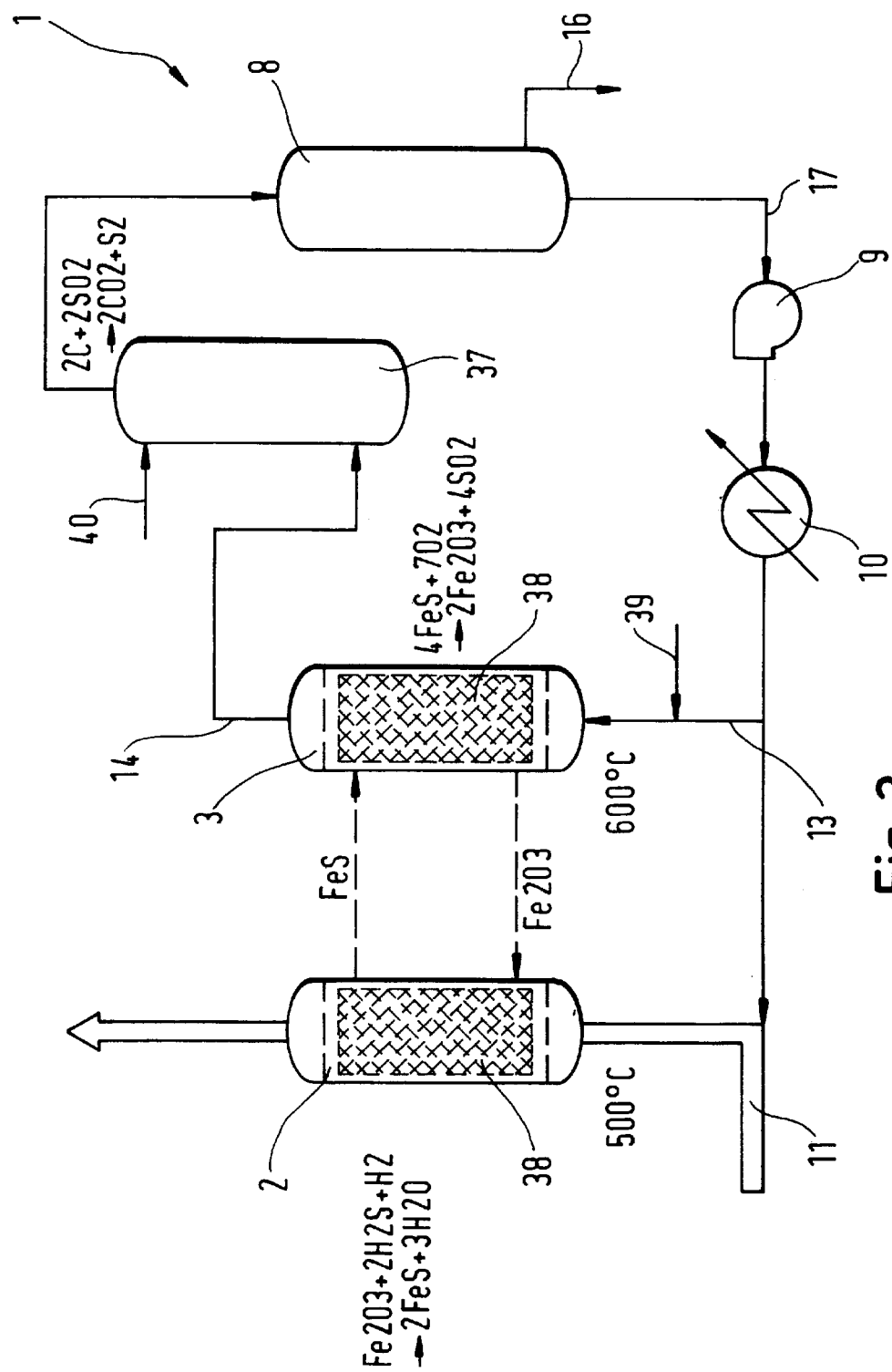
FIG. 2 is a block diagram of the conventional desulfurization apparatus.
Figure 3:
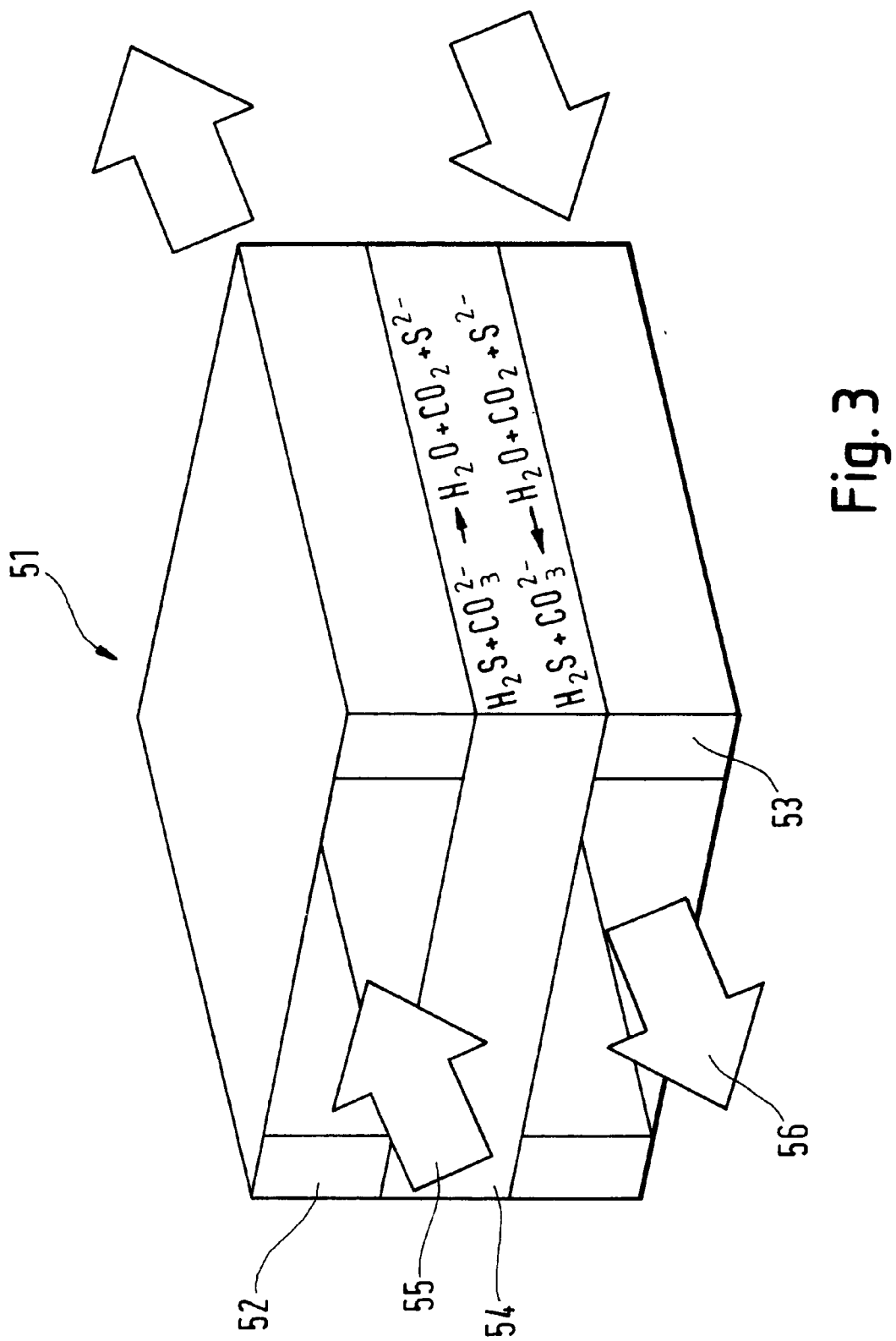
FIG. 3 is a perspective view of a first embodiment of the desulfurization apparatus in accordance with this invention.
Figure 4:
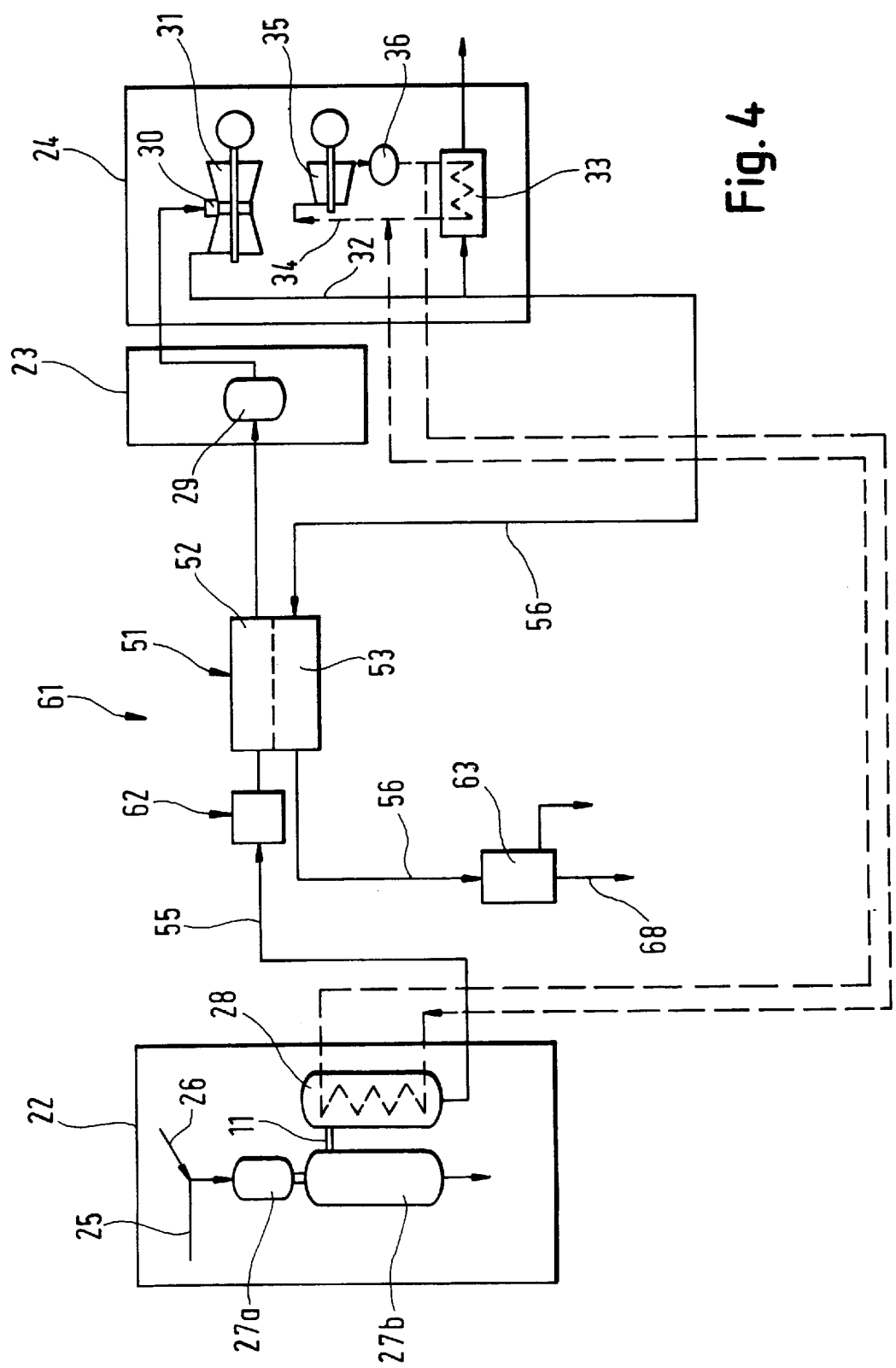
FIG. 4 is a block diagram of an electric power plant using the desulfurization apparatus in accordance with the invention.

FIG. 3 is a perspective view of a desulfurization apparatus of a preferred embodiment in accordance with the invention. And FIG. 4 is an electric power generating system using the desulfurization apparatus.

The coal gasification compound electric power plant 61 (FIG. 4) (an electric power generating system) using the desulfurization apparatus 51 has as its major components the coal gasification equipment 22, the desulfurization apparatus 51, a scrubbing apparatus 23, and a compound electric power generating unit 24 (an electric power generating apparatus).

In the coal gasification equipment 22, at first, coal 25 is supplied to a gasification furnace 27a having a high temperature together with a gasification agent (oxygen) 26 and they are mixed. The mixed coal and gasification agent 26 are gasified within the gasification furnace 27a at a high temperature and gas pressure, which varies in accordance with the gasification method. One example is an internal temperature of about 1400° C. and an internal pressure of about 2 MPa.

The produced coal gas 11 is mainly carbon monoxide, hydrogen, carbon dioxide, and water vapor, and normally contains less than 1% hydrogen sulfide. The coal gas 11 is cooled to a suitable temperature (about 700° C.) in a gas cooler 28. In the cooled coal gas 55, solid material is removed by a filter 62. Thereafter, the coal gas 55 is introduced into the flowing passage 52 in order to be processed in the desulfurization apparatus 51.

In FIG. 3, the desulfurization apparatus 51 is structured such that a flowing passage 52 through which the gas flows in order to be to be processed (the sulfur compound-supply portion) is disposed at one end of the sulfur-moving body 54 having a planar shape (the sulfide-ion-producing portion) and a sulfur discharge gas flowing passage 53 (the sulfur compound discharge portion) is disposed at the other end thereof.

The sulfur-moving body 54 (which can be considered as an example of the sulfide-ion-producing portion) in the desulfurization apparatus 51 is shaped as a plate having a thickness of about 1 mm. In this embodiment, the sulfur-moving body 54 includes a molten carbonate which functions as a sulfur-dissolved medium, impregnated into a porous member to which a ceramic such as lithium aluminate is sintered. As the carbonate, one or a mixture of carbonates of alkali metals, such as Li, Na and K, or a mixture of alkali metal carbonate and an alkaline earth element carbonate, such as Mg, Ca, Sr and Ba, is used.

When the carbonate is melted at a predetermined temperature (ranging from, for example, 400° C. to 850° C., there is a lot of carbonate ion $CO_3^{2-}$ within the solution. Hydrogen sulfide $H_2S$ contained in the coal gas 55 flows through passage 52 in order to be processed and is absorbed into the molten carbonate. Thereafter, a chemical reaction occurs, as shown by formula (4).

$$H_2S+CO_3^{2-} \rightarrow H_2O+CO_2+S^{2-} \qquad (4)$$

The sulfide ion $S^{2-}$ produced by the chemical reaction of the formula (4) diffuses through the thickness of the sulfur-moving body 54 within the molten carbonate. The diffused sulfide ion reaches an interface with respect to the sulfur discharge gas 56 flowing through the sulfur discharge gas passage 53 arranged at the back of the sulfur moving-body 54.

The sulfur discharge gas 56 is mainly composed of $H_2O$ and $CO_2$. The flow of the sulfur discharge gas 56 is different from the flow of the coal gas 55. Concretely speaking, they flow opposite to each other.

Accordingly, in the interface between the molten carbonate and the sulfur discharge gas 56, a chemical reaction occurs, as shown in formula (5), which operates in the reverse direction of the reaction in formula (4).

$$H_2S+CO_3^{2-} \leftarrow H_2O+CO_2+S^{2-} \qquad (5)$$

The produced hydrogen sulfide (a gas phase) is mixed into the sulfur discharge gas 56. At this time, when the product of the partial pressure of $H_2O$ and the partial pressure of $CO_2$ contained in the sulfur discharge gas 56 is larger than the product of the partial pressure of $H_2O$ and the partial pressure of $CO_2$ contained in the coal gas 55, the chemical reaction shown in the formula (5) is promoted.

Further, in FIG. 4 the coal gas 55 from which sulfur is removed in the desulfurization apparatus 51 is scrubbed by the scrubbing apparatus 23. The scrubbed coal gas 55 is supplied to the combined electric power equipment 24. The coal gas 55 supplied to the burner 30 is burned within the combined electric power generating equipment 24. The combustion gas rotates the gas turbine 31 and generates electric power while expanding within the gas turbine 31.

After burning, the coal gas 55 is discharged as an exhaust gas 32 from the gas turbine 31. A portion of the exhaust gas 32 becomes a heat source for generating steam 34 by exhaust heat recovery boiler 33. The remaining exhaust gas 32 is supplied to the desulfurization apparatus 51 as the sulfur discharge gas 56.

After the heat is recovered by the exhaust heat recovery boiler 33, the exhaust gas 32 is discharged to an outer portion. The steam 34, heat-exchanged and produced in the exhaust heat recovery boiler 33, is fed to the steam turbine 35 to generate electric power. A portion of the steam 34 is discharged from the steam turbine 35 and condensed in the condenser 36. Then, the condensed steam is again supplied to the exhaust heat recovery boiler 33. The remaining steam 34 is supplied to the gas cooler 28.

The steam 34 produced by the heat recovered from the coal gas 11 in the gas cooler 28 is fed to the steam turbine 35.

The sulfur discharge gas 56 containing $H_2S$ produced in the above manner has its sulfur removed in a Claus reactor or in sulfur recovery equipment 63 using a lime plaster process. The gas 56 in which the sulfur has been removed is discharged into ambient air as a clean gas 68 (a tail gas). The removed sulfur is recovered. The gas 68 can be reused as a gas passing through the sulfur discharge gas communication passage 53.

In the present desulfurization apparatus and electric power plants using the same, the chemical reaction shown in formula (4) occurs in the end of passage 52 for the gas to be processed in the sulfur-moving body 54. Further, the chemical reaction shown in formula (5) occurs in the end of the sulfur discharge gas passage 53 in the sulfur-moving body 54. Accordingly, hydrogen sulfide continuously moves to the sulfur discharge gas 56 from the coal gas 55 which is flowing through passage 52, so that the concentration of hydrogen sulfide contained in the sulfur discharge gas becomes higher than the concentration of hydrogen sulfide contained in the coal gas 55. Therefore, hydrogen sulfide can be efficiently concentrated.

Further, the sulfur discharge gas 56 uses the burned exhaust gas 32 flowing out from the gas turbine 31, so that the partial pressure of $H_2O$ and $CO_2$ is higher than the partial pressures of $H_2O$ and $CO_2$ in the coal gas 55. Accordingly, the chemical reaction shown in formula (5) occurs at the end of the sulfur discharge gas passage 53, and the reaction largely proceeds to the left. Therefore, the concentration of hydrogen sulfide contained in the sulfur discharge gas 56 becomes higher than the concentration of hydrogen sulfide contained in the coal gas 55, and hydrogen sulfide can be efficiently condensed.

Further, when the difference between the temperature of the sulfur discharge gas 56 and the temperature of the coal gas 55 is large, the chemical reaction is promoted and the recovery rate of sulfur is improved. Preferably, when the temperature of the sulfur discharge gas 56 is higher than the temperature of the coal gas 55, the chemical reaction is promoted, so that the recovery efficiency of sulfur is improved.

Still further, since the sulfur-moving body 54 is constituted of a porous member containing a molten carbonate, the carbonate is in a liquid state at operating temperature, so that ions move faster than if the carbonate were in a solid state, thereby improving the reaction efficiency.

Furthermore, since the flow direction of the coal gas 55 and the flow direction of the sulfur discharge gas 56 are different from each other, that is, they flow in opposite directions, the concentration of hydrogen sulfide contained in the sulfur discharge gas 56 increases as it flows, so that a sulfur discharge gas 56 containing a high concentration of hydrogen sulfide can be obtained.

In the embodiment shown in FIG. 3, directly opposing flows are illustrated. While directly opposing flows may be preferred, the invention is not limited to directly opposing flows. For example the flows may cross or may be set at some other angle relative to each other.

Next, the structure and operation of a second embodiment in accordance with the invention will be described below with reference to FIG. 5.

In each of the following embodiments, the same reference numerals are attached to the same elements as those of the first embodiment, and overlapping explanations will be omitted.

The key feature of the second embodiment is that the desulfurization apparatus 51 is structured by laminating the sulfur-moving bodies 54 and alternately inserting the passage 52 and the sulfur discharge gas passage 53 therebetween. Accordingly, a lot of sulfide can be efficiently recovered from the coal gas 55.

Figure 5:
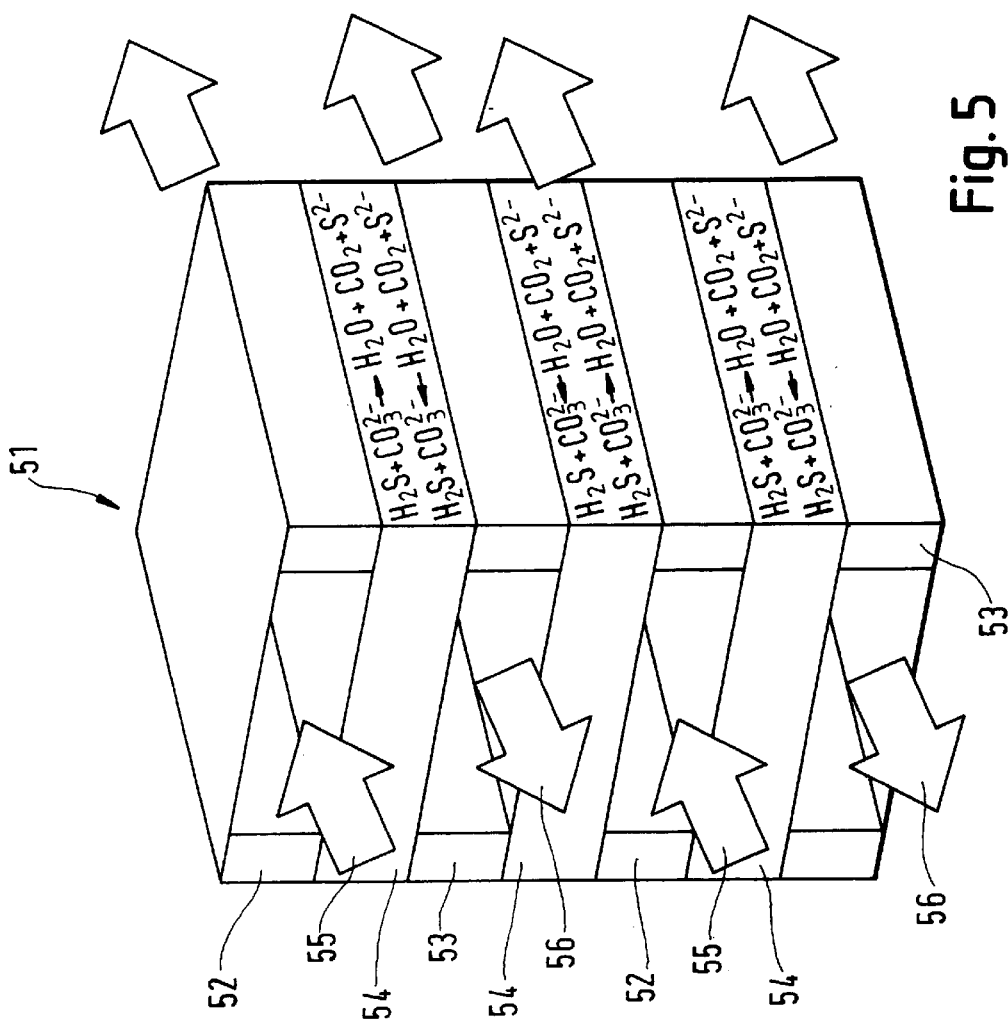
FIG. 5 is a perspective view of a second embodiment of a desulfurization apparatus in accordance with the invention.

FIG. 5 is a cross sectional view of the second embodiment of the desulfurization apparatus in accordance with the invention.

The passage 52 and the sulfur discharge gas passage 53 are alternately layered along with planar sulfur-moving bodies 54, thereby constituting the desulfurization apparatus 51.

The flow directions of the coal gas 55 and the sulfur discharge gas 56 are different from each other. That is, they flow in directions opposite to each other.

In the second embodiment of the desulfurization apparatus mentioned above, by increasing the reaction area for producing the sulfide ions from the sulfide supplied to the sulfur-moving body 54, the desulfurization process is performed on a large amount of coal gas 55, so that the sulfide can be recovered. Further, the desulfurization apparatus 51 can be made compact by layering the sulfur-moving bodies 54.

Next, the structure and operation of a third embodiment in accordance with the invention will be described below with reference to FIGS. 6(a) and 6(b).

The key feature of the third embodiment is that the desulfurization apparatus 51 is structured by disposing the sulfur-moving bodies 54 in a honeycomb manner. A lot of sulfide can be efficiently recovered from the coal gas 55.

Figure 6:
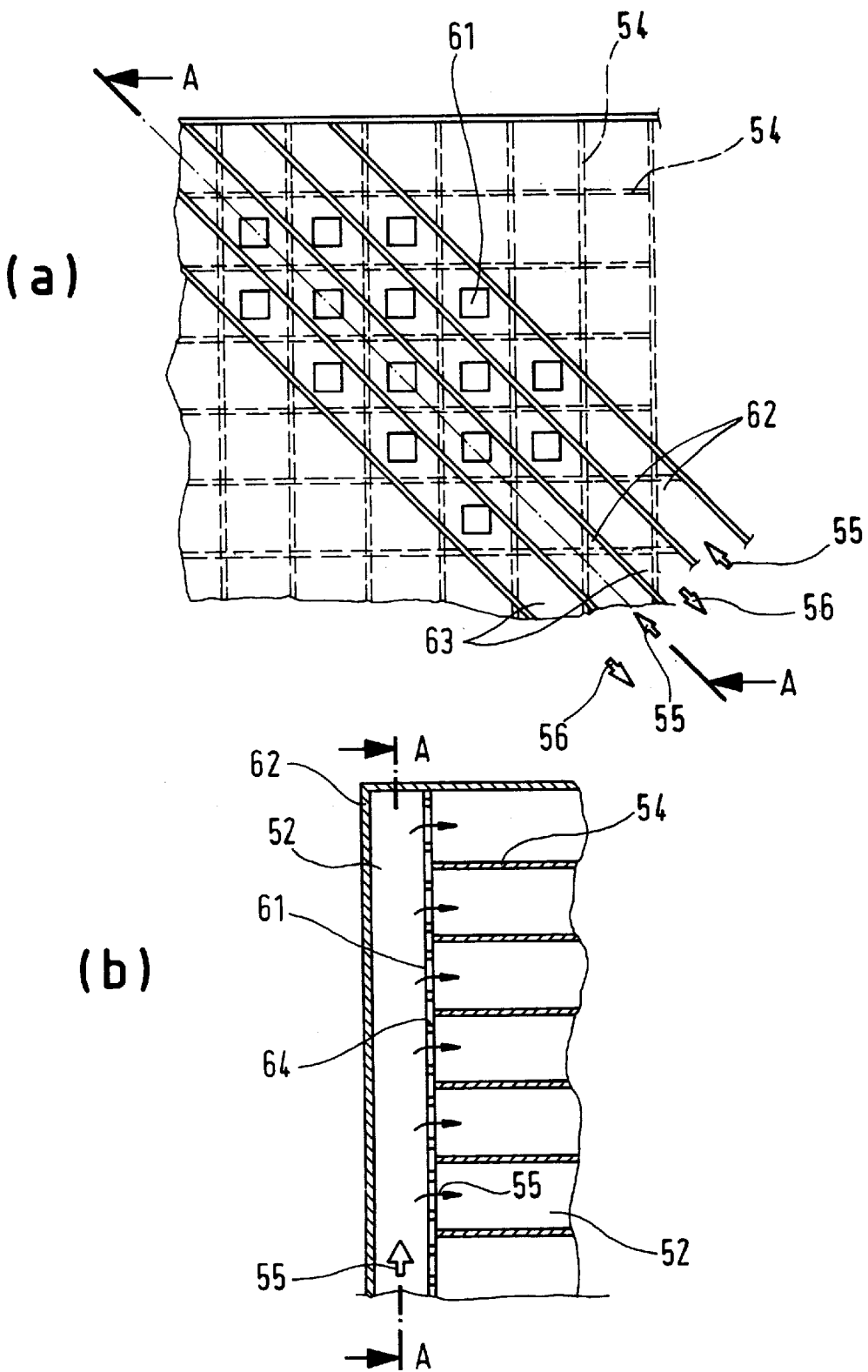
FIGS. 6(a) and 6(b) are a front elevational view and a cross sectional view of a third embodiment of a desulfurization apparatus in accordance with the invention.

FIG. 6(a) is a front elevational view of the third embodiment of the desulfurization apparatus in accordance with the invention and FIG. 6(b) is a cross sectional view along a line A—A in FIG. 6(a).

The cylindrical sulfur-moving bodies 54 are disposed in a honeycomb manner. A partition plate 64 having an opening portion 61 is provided in one end in a longitudinal direction of the sulfur-moving body 54. The other end of the sulfur-moving body 54 is closed. A supply manifold 62 for supplying the coal gas 55 to the sulfur-moving body 54 from the opening portion 61 and a recovery manifold 63 for recovering the sulfur discharge gas 56 from the opening portion 61, are provided in the opening portion 61 end of the sulfur-moving body 54.

That is, a sulphide-ion producing structure is in the form of a grid of intersecting platelike bodies made of the sulphur moving bodies 54 and extending in two transverse directions to define a honeycomb array of gas passages. Sulphur bearing gas manifolds and gas discharge manifolds 55 and 56 are arranged alternatingly and extend at a diagonal to the two transverse directions of the intersecting platelike bodies. The sulphur bearing gas manifolds and the discharge manifolds are arranged such that alternating ones of the gas passages in both of the two transverse directions are connected to the sulphur bearing gas manifolds, while intervening ones of the gas passages in both of the two directions of connected to the gas discharge (recovering) manifolds 63 via the openings 61.

The sulfur discharge gas 56 is discharged from four opening portions 61 adjacent to one opening portion 61 from which the coal gas 55 is supplied.

The coal gas 55 supplied from the supply manifold 62 reaches the cylindrical sulfur-moving body 54 from the opening portion 61. The sulfide ion is produced in the sulfur-moving body 54. The sulfide is produced by the produced sulfide ion. The produced sulfide is exhausted from the exhaust manifold 63 through the opening portion 61 by the sulfur discharge gas 56.

In the third embodiment of the desulfurization apparatus mentioned above, by increasing the reaction area for producing the sulfide ions in the sulfur-moving body 54, the desulfurization process is performed on a large amount of coal gas 55. Accordingly, the sulfide can be efficiently recovered. Further, the desulfurization apparatus 51 can be made compact by layering the sulfur-moving bodies 54.

Figure 7:
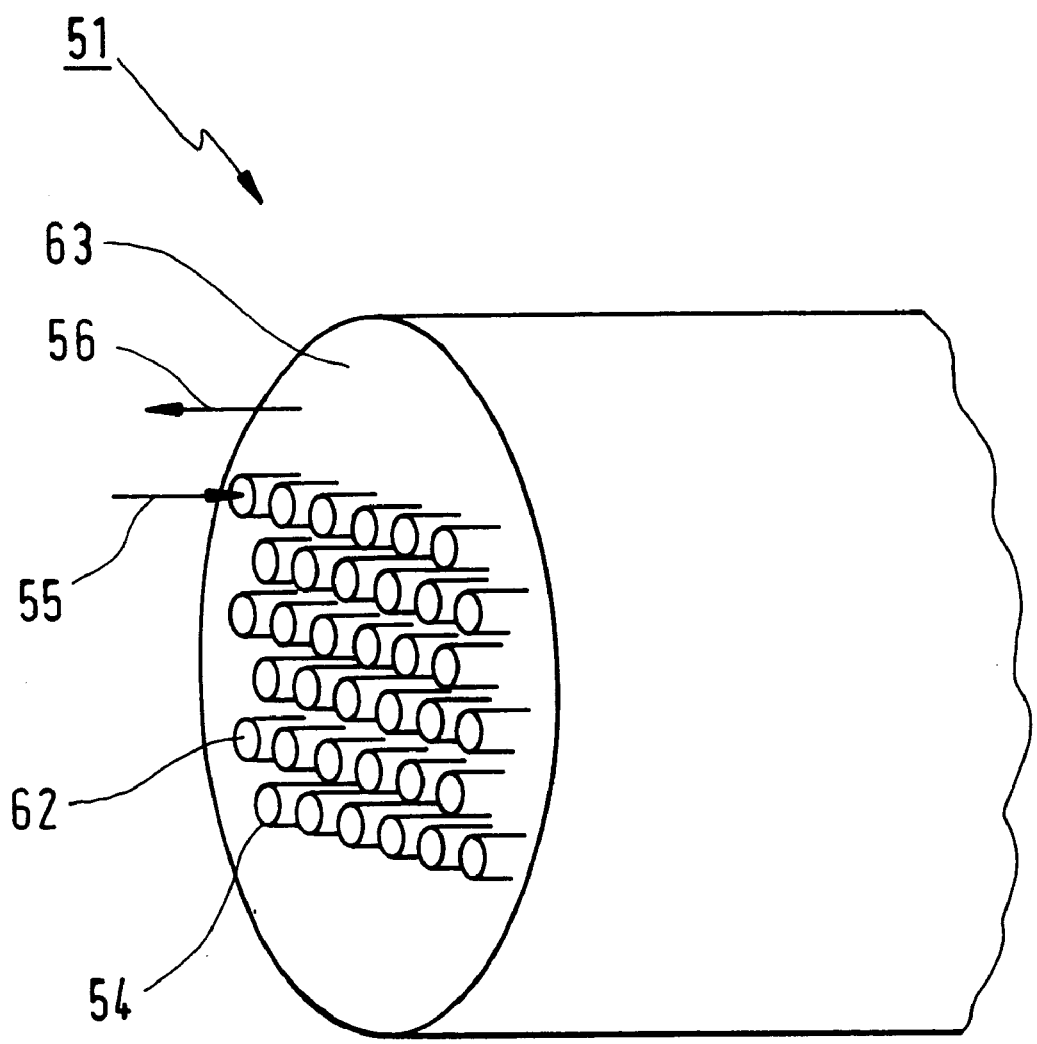
FIG. 7 is a perspective view of a fourth embodiment of a desulfurization apparatus in accordance with the invention.

Next, the structure and operation of a fourth embodiment in accordance with the invention will be described below with reference to FIG. 7.

According to the fourth embodiment, the desulfurization apparatus 51 is structured by disposing the sulfur-moving bodies 54 in a shell tube manner. A lot of sulfide can be efficiently recovered from the coal gas 55 in this way.

A plurality of cylindrical sulfur-moving bodies 54 are disposed. A hollow portion of the sulfur-moving body 54 becomes a supply manifold 62 for supplying the coal gas 55 to the sulfur-moving body 54. Further, a hollow cylindrical recovery manifold 63 for housing a plurality of sulfur-moving bodies 54 therewithin is provided. The recovery manifold 63 recovers the sulfur discharge gas 56 discharged from the sulfur-moving body 54.

A plurality of sulfur-moving bodies 54, a plurality of supply manifolds 62, and the recovery manifold 63 are disposed in a shell tube manner.

The coal gas 55 supplied from the supply manifold 62 reaches the cylindrical sulfur-moving body 54. The sulfide ion is produced in the sulfur-moving body 54 as described above. The sulfide thus produced is discharged from the exhaust manifold 63 through the sulfur discharge gas 56.

In this case, the flow direction within the supply manifold 62 and the flow direction within the recovery manifold 63 are opposed to each other. Further, when the diameter of the supply manifold 62 is made small, the concentration of the sulfide contained in the coal gas 55 can be made small.

Further, in the case of using the desulfurization apparatus 51 having the above structure for an electric power plant, since the pressure within the supply manifold 62 is higher than the pressure within the recovery manifold 63, it is suitable to dispose the recovery manifold 63 within the sulfur-moving body 54 and dispose the supply manifold 62 at the outer side of the sulfur-moving body 54. By making the structure in the above manner, even when the thickness of the sulfur-moving body 54 is thin and the curvature thereof is large, the structure can sufficiently withstand the pressure from the outer portion.

In the fourth embodiment of the desulfurization apparatus mentioned above, by increasing the reaction area for producing sulfide ions from the sulfide supplied to the sulfur-moving body 54, the desulfurization process can be performed on a large amount of coal gas 55. Further, since the diameter of the supply manifold 62 is made small, the concentration becomes small, so that desulfurization can be efficiently performed. Still further, the desulfurization apparatus 51 can be made compact by disposing a plurality of the sulfur-moving bodies 54 in a shell tube manner. Furthermore, the manufacture thereof can be easily performed. Moreover, the manufacturing cost for the desulfurization apparatus 51 can be reduced.

The invention is not limited to the embodiments mentioned above, and can be variously modified and realized in a range within the scope of the invention. For example, it is not necessary to directly use the exhaust gas from the gas turbine for the sulfur discharge gas, and it is possible to use the gas from which the sulfur is removed as the sulfur discharge gas where the desulfurization apparatus and the sulfur recovery equipment are a closed loop. Further, while the desulfurization apparatus can be shaped in a planar manner or a honeycomb manner in order to increase the reaction area, it can also be shaped in a shell tube manner whereby the method of manufacture is simplified and the manufacturing cost is reduced.

What is claimed is:

1. A desulphurizing apparatus, comprising:

a sulphide-ion producing structure in the form of a grid of intersecting plate bodies intersecting in two directions to define a honeycomb array of gas passages, said plate bodies including a material capable of separating sulphur from a sulphur bearing gas;

at least one sulphur bearing gas manifold connected to at least two of said gas passages; and at least one gas discharge manifold connected to at least another two of said gas passages, wherein said sulphur bearing gas manifold and said discharge manifold are arranged such that alternating ones of said gas passages which are spaced from one another in both of said two directions are connected to said at least one sulphur bearing gas manifold and intervening ones of said gas passages in both of said two directions are connected to said at least one gas discharge manifold, wherein said at least one sulphur bearing gas manifold and said at least one gas discharge manifold comprise an array of sulphur bearing gas manifolds and gas discharge manifold arranged alternatingly and extending at a diagonal to said two directions.

2. The desulphurizing apparatus of claim 1, wherein said two directions are transverse directions.

* * * * *